United States Patent
Glimberg et al.

(10) Patent No.: US 12,487,602 B2
(45) Date of Patent: Dec. 2, 2025

(54) NAVIGATION FOR A ROBOTIC WORK TOOL

(71) Applicant: HUSQVARNA AB, Huskvarna (SE)

(72) Inventors: Tommy Glimberg, Nässjö (SE); Stefan Grufman, Bankeryd (SE); Fredrik Kallström, Huskvarna (SE); Mattias Kamfors, Jönköping (SE); Marcus Liljedahl, Huskvarna (SE); Björn Mannefred, Jönköping (SE); Beppe Hellsin, Jönköping (SE)

(73) Assignee: HUSQVARNA AB, Huskvarna (SE)

( * ) Notice: Subject to any disclaimer, the term of this patent is extended or adjusted under 35 U.S.C. 154(b) by 375 days.

(21) Appl. No.: 17/913,002

(22) PCT Filed: Mar. 24, 2021

(86) PCT No.: PCT/SE2021/050254
§ 371 (c)(1),
(2) Date: Sep. 20, 2022

(87) PCT Pub. No.: WO2021/206606
PCT Pub. Date: Oct. 14, 2021

(65) Prior Publication Data
US 2023/0185309 A1 Jun. 15, 2023

(30) Foreign Application Priority Data
Apr. 6, 2020 (SE) .................... 2050386-8

(51) Int. Cl.
*G05D 1/00* (2024.01)
*A01D 34/00* (2006.01)
(Continued)

(52) U.S. Cl.
CPC ......... *G05D 1/0274* (2013.01); *A01D 34/008* (2013.01); *G05D 1/0265* (2013.01); *A01D 2101/00* (2013.01)

(58) Field of Classification Search
CPC combination set(s) only.
See application file for complete search history.

(56) References Cited

U.S. PATENT DOCUMENTS

| 5,204,814 A | 4/1993 | Noonan et al. |
| 9,436,185 B2 | 9/2016 | Schnittman |

(Continued)

FOREIGN PATENT DOCUMENTS

| CN | 108073164 A | 5/2018 |
| CN | 110622085 A | 12/2019 |

(Continued)

OTHER PUBLICATIONS

International Search Report and Written Opinion for International Application No. PCT/SE2021/050254 mailed May 7, 2021.

(Continued)

*Primary Examiner* — Adam R Mott
*Assistant Examiner* — Ricardo I Viscarra
(74) *Attorney, Agent, or Firm* — Burr & Forman

(57) ABSTRACT

A robotic work tool system (200) comprising a robotic work tool (100) comprising a controller (110), the controller (110) being configured to determine an area locality (310) associated with a hindrance; determine a classifier (C) associated with the area locality (310); and determine an action for the robotic work tool (100), wherein the action is based on the classifier (C).

13 Claims, 4 Drawing Sheets

(51) Int. Cl.
  *A01D 101/00* (2006.01)
  *G06N 3/04* (2023.01)
  *G06T 7/00* (2017.01)
  *G06T 7/194* (2017.01)
  *G06T 7/55* (2017.01)

(56) References Cited

U.S. PATENT DOCUMENTS

| | | | |
|---|---|---|---|
| 2010/0013615 A1 | 1/2010 | Hebert et al. | |
| 2012/0101679 A1* | 4/2012 | Anderson | A01D 75/185 |
| | | | 901/1 |
| 2014/0032033 A1 | 1/2014 | Einecke et al. | |
| 2015/0190925 A1* | 7/2015 | Hoffman | B25J 9/161 |
| | | | 901/47 |
| 2015/0296707 A1 | 10/2015 | Fukuda et al. | |
| 2018/0210445 A1 | 7/2018 | Choi et al. | |
| 2019/0332119 A1 | 10/2019 | Kim et al. | |
| 2019/0346849 A1 | 11/2019 | Moshkina-Martinson et al. | |
| 2021/0124354 A1* | 4/2021 | Munich | G05D 1/0044 |

FOREIGN PATENT DOCUMENTS

| | | |
|---|---|---|
| EP | 3257420 A | 12/2017 |
| GB | 2563347 A | 12/2018 |
| WO | 2018108180 A1 | 6/2018 |
| WO | 2019177418 A1 | 9/2019 |
| WO | 2019194628 A1 | 10/2019 |

OTHER PUBLICATIONS

Office Action and Search Report for Swedish Application No. 2050386-8 mailed on Nov. 6, 2020.

* cited by examiner

NAVIGATION FOR A ROBOTIC WORK TOOL

TECHNICAL FIELD

This application relates to robotic work tools and in particular to a system and a method for providing an improved navigation for a robotic work tool, such as a lawnmower.

BACKGROUND

Automated or robotic work tools, such as robotic lawnmowers, are becoming increasingly more popular. In a typical deployment a work area, such as a garden, the robotic work tool is likely to encounter hindrances of various types. The robotic work tools of today often run in to the same issues or hindrances over and over again. The robotic work tool repeatedly collides with obstacles, such as trees, stones, walls or other obstacles in the garden. The wheels of the robotic work tool repeatedly slip in the same positions at slopes, causing bald spots in the lawn. The robotic work tool may also repeatedly get stuck in the same areas due to muddy or otherwise wet conditions. And, in examples where the robotic work tool is a robotic lawnmower, the cutting knives repeatedly hit the same stone or protruding root.

This is both reducing the efficiency of the robotic work tool and increasing the wear and tear of the robotic work tool.

Thus, there is a need for an improved manner of enabling a reliable navigation for a robotic work tool, such as a robotic lawnmower, that increases the efficiency of the robotic work tool and/or reduces the wear and tear of the robotic work tool.

SUMMARY

As will be disclosed in detail in the detailed description, the inventors have realized that by not only marking the location of the various hindrances, but also classifying the hindrances and controlling the actions of the robotic work tool based on the classification, the robotic work tool may be navigated in relation to the hindrances in a manner that increases the efficiency and reduces the wear and tear of the robotic work tool compared to contemporary robotic work tools.

It is therefore an object of the teachings of this application to overcome or at least reduce those problems by providing a robotic work tool system comprising a robotic work tool comprising a controller, the controller being configured to: determine an area locality associated with a hindrance; determine a classifier (C) associated with the area locality; and determine an action for the robotic work tool, wherein the action is based on the classifier (C).

In one embodiment the classifier (C) is associated with the nature of the effect of the area locality (310). In one embodiment the controller is further configured to: detect the hindrance; determine the area locality; associate the hindrance with the area locality; and determine the classifier (C) based on a type of hindrance and store the classifier (C).

In one embodiment the type of hindrance is at least one of gradient, slip, obstacle, or stuck.

In one embodiment the controller is further configured to determine the classifier (C) based on a retrieval of a stored classifier.

In one embodiment the controller is configured to: determine an angle at which the robotic work tool approaches the area locality and wherein the classifier (C) is further based on said angle at which the robotic work tool approaches the area locality.

In one embodiment the angle at which the robotic work tool approaches the area locality corresponds to one out of a plurality of angle sectors, whereby the classifier (C) is based on said one out of a plurality of angle sectors.

In one embodiment the angle at which the robotic work tool approaches the area locality corresponds to an arrival angle (alpha) of the robotic work tool, whereby the classifier (C) is based on said arrival angle (alpha).

In one embodiment the angle at which the robotic work tool approaches the area locality corresponds to said one out of a plurality of angle sectors and to an arrival angle (alpha) of the robotic work tool, whereby the classifier (C) is based on said one out of a plurality of angle sectors and said arrival angle (alpha).

In one embodiment the controller is further configured to: increase a counter associated with the area locality; determine whether the counter exceeds classifier threshold associated with a hindrance type and a classifier, and, if so, determine the classifier (C) to be the classifier associated with the classifier threshold.

In one embodiment the robotic work tool further comprises a memory and wherein the controller is further configured to store at least one indication of an area locality and associated classifier (C) in a virtual map in the memory.

In one embodiment the controller is further configured to operate the robotic work tool within a work area and to store a plurality of indications of area locality and associated classifier (C), wherein the stored area localities are adjacent one another and covers at least a portion of the work area.

In one embodiment the controller is further configured to retrieve at least on area locality from the memory and adapt the navigation of the robotic work tool based on the location of the area locality and/or the classifier of the area locality.

In one embodiment the controller is further configured to determine the area locality based on a determination of the location of the robotic work tool.

In one embodiment the action is at least one of: adapting speed of approach, avoiding area locality, entering in reverse, approaching at an approach angle (beta), stopping work tool, limit acceleration, limiting turn angle, or adapting operating height of work tool.

In one embodiment the robotic work tool is a robotic lawnmower.

It is also an object of the teachings of this application to overcome the problems by providing a method for use in a robotic work tool system comprising a robotic work tool, the method comprising: determining an area locality associated with a hindrance; determining a classifier (C); and determining an action for the robotic work tool, wherein the action depends on the classifier (C).

Other features and advantages of the disclosed embodiments will appear from the following detailed disclosure, from the attached dependent claims as well as from the drawings. Generally, all terms used in the claims are to be interpreted according to their ordinary meaning in the technical field, unless explicitly defined otherwise herein. All references to "a/an/the [element, device, component, means, step, etc.]" are to be interpreted openly as referring to at least one instance of the element, device, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention will be described in further detail under reference to the accompanying drawings in which.

DETAILED DESCRIPTION

The disclosed embodiments will now be described more fully hereinafter with reference to the accompanying drawings, in which certain embodiments of the invention are shown. This invention may, however, be embodied in many different forms and should not be construed as limited to the embodiments set forth herein. Like reference numbers refer to like elements throughout.

It should be noted that even though the description given herein will be focused on robotic lawnmowers, the teachings herein may also be applied to, robotic ball collectors, robotic mine sweepers, robotic farming equipment, or other robotic work tools where lift detection is used and where the robotic work tool is susceptible to dust, dirt or other debris.

Figure 1A:
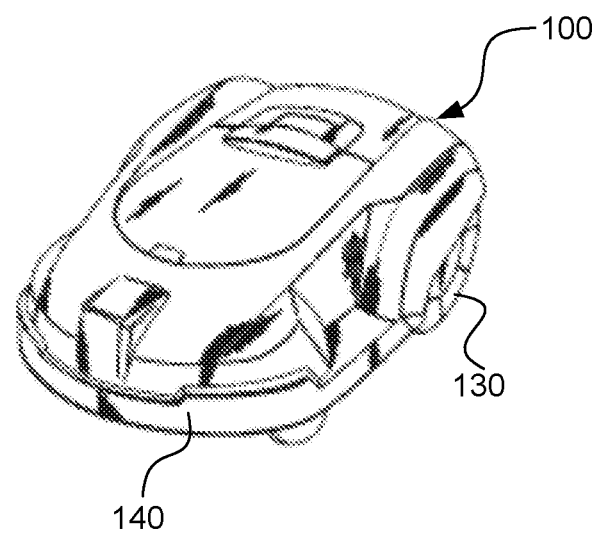
FIG. 1A shows an example of a robotic lawnmower according to one embodiment of the teachings herein.

FIG. 1A shows a perspective view of a robotic work tool 100, here exemplified by a robotic lawnmower 100, having a body 140 and a plurality of wheels 130 (only one pair is shown). The robotic work tool 100 may be a mono-chassis type, as in FIG. 1A. A multi-chassis type comprises more than one main body part that are movable with respect to one another. A mono-chassis type comprises only one main body part.

Figure 1B:
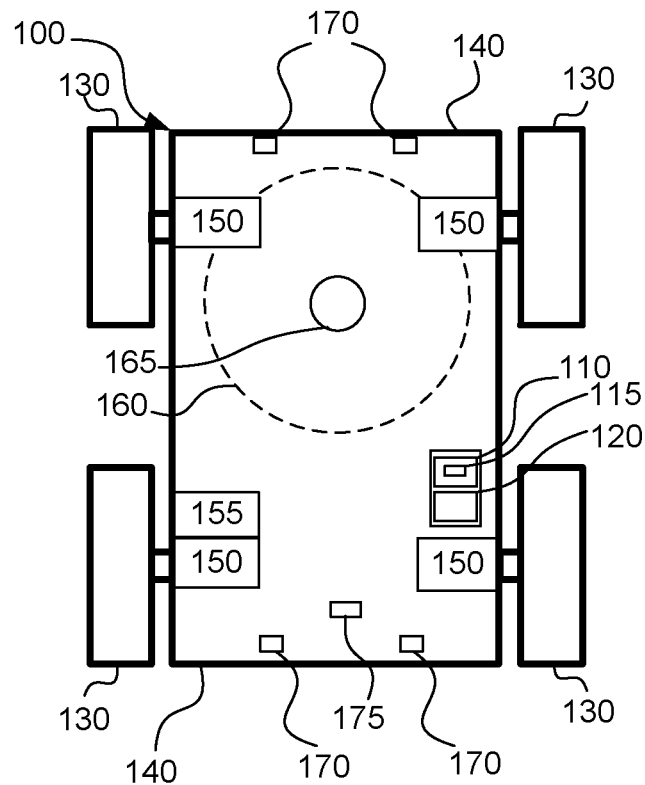
FIG. 1B shows a schematic view of the components of an example of a robotic work tool being a robotic lawnmower according to an example embodiment of the teachings herein.

FIG. 1B shows a schematic overview of the robotic work tool 100, also exemplified here by a robotic lawnmower 100. In this example embodiment the robotic lawnmower 100 is of a mono-chassis type, having a main body part 140. The main body part 140 substantially houses all components of the robotic lawnmower 100. The robotic lawnmower 100 has a plurality of wheels 130. In the exemplary embodiment of FIG. 1B the robotic lawnmower 100 has four wheels 130, two front wheels and two rear wheels. In the embodiment of FIGS. 1A and 1B the rear wheels have a larger diameter than the front wheels. At least some of the wheels 130 are drivably connected to at least one electric motor 150. It should be noted that even if the description herein is focused on electric motors, combustion engines may alternatively be used, possibly in combination with an electric motor. In the example of FIG. 1B, each of the wheels 130 is connected to a respective electric motor. This allows for driving the wheels 130 independently of one another which, for example, enables steep turning and rotating around a geometrical centre for the robotic lawnmower 100. It should be noted though that not all wheels need be connected to each a motor, but the robotic lawnmower 100 may be arranged to be navigated in different manners, for example by sharing one or several motors 150. In an embodiment where motors are shared, a gearing system may be used for providing the power to the respective wheels and for rotating the wheels in different directions. In some embodiments, one or several wheels may be uncontrolled and thus simply react to the movement of the robotic lawnmower 100.

The robotic lawnmower 100 also comprises a grass cutting device 160, such as a rotating blade 160 driven by a cutter motor 165. The grass cutting device being an example of a work tool 160 for a robotic work tool 100. The robotic lawnmower 100 also has (at least) one battery 155 for providing power to the motor(s) 150 and/or the cutter motor 165.

The robotic lawnmower 100 also comprises a controller 110 and a computer readable storage medium or memory 120. The controller 110 may be implemented using instructions that enable hardware functionality, for example, by using executable computer program instructions in a general-purpose or special-purpose processor that may be stored on the memory 120 to be executed by such a processor. The controller 110 is configured to read instructions from the memory 120 and execute these instructions to control the operation of the robotic lawnmower 100 including, but not being limited to, the propulsion of the robotic lawnmower. The controller 110 may be implemented using any suitable, available processor or Programmable Logic Circuit (PLC). The memory 120 may be implemented using any commonly known technology for computer-readable memories such as ROM, RAM, SRAM, DRAM, FLASH, DDR, SDRAM or some other memory technology.

The robotic lawnmower 100 may further be arranged with a wireless communication interface 115 for communicating with other devices, such as a server, a personal computer or smartphone, the charging station, and/or other robotic work tools. Examples of such wireless communication devices are Bluetooth®, Wi-Fi® (IEEE802.11b), Global System Mobile (GSM) and LTE (Long Term Evolution), to name a few.

In embodiments where the robotic lawnmower 100 comprises a communication interface 115, the memory may be seen as comprising external storage, wherein data may be retrieved from such external storage. For the purpose of this application no difference will be made between a local memory 120 and an external memory accessed through a communication interface 115.

For enabling the robotic lawnmower 100 to navigate with reference to a boundary wire emitting a magnetic field caused by a control signal transmitted through the boundary wire (as will be discussed with reference to FIG. 2), the robotic lawnmower 100 is further configured to have at least one magnetic field sensor 170 arranged to detect the magnetic field (not shown) and for detecting the boundary wire and/or for receiving (and possibly also sending) information to/from a signal generator. In some embodiments, the sensors 170 may be connected to the controller 110, possibly via filters and an amplifier, and the controller 110 may be configured to process and evaluate any signals received from the sensors 170. The sensor signals are caused by the magnetic field being generated by the control signal being transmitted through the boundary wire. This enables the controller 110 to determine whether the robotic lawnmower 100 is close to or crossing the boundary wire, or inside or outside an area enclosed by the boundary wire.

Alternatively or additionally, the robotic lawnmower 100 may be configured to navigate inside a work area by determining the location and comparing the determined location of the robotic lawnmower to stored boundaries of the work area. The location may be determined through the use of at least one navigation sensor, such as a beacon navigation sensor and/or a satellite navigation sensor 190. The beacon navigation sensor may be a Radio Frequency receiver, such as an Ultra-Wide Band (UWB) receiver or sensor, configured to receive signals from a Radio Frequency beacon, such as a UWB beacon. Alternatively or additionally, the beacon navigation sensor may be an optical receiver configured to receive signals from an optical beacon. The satellite navigation sensor may be a GPS (Global Positioning System) device RTK (Real-Time Kinematic) or other Global Navigation Satellite System (GNSS) device.

Alternatively or additionally, the location of the robotic lawnmower may be determined based on deduced reckoning.

In embodiments where the robotic lawnmower 100 is arranged with a navigation sensor for determining the location of the robotic lawnmower 100, the magnetic sensors 170 are optional.

The robotic lawnmower 100 further comprises one or more sensors for deduced navigation 180. Examples of sensors for deduced reckoning are odometers, accelerometers, gyroscopes, and compasses to mention a few examples.

The robotic lawnmower 100 also comprises one or more collision detectors 175. The collision detectors 175 may be utilized by the robotic lawnmower 100 to determine that a hindrance has been encountered, such as an obstacle for example a boulder, a stone, a bush, a tree or a wall.

Figure 2:
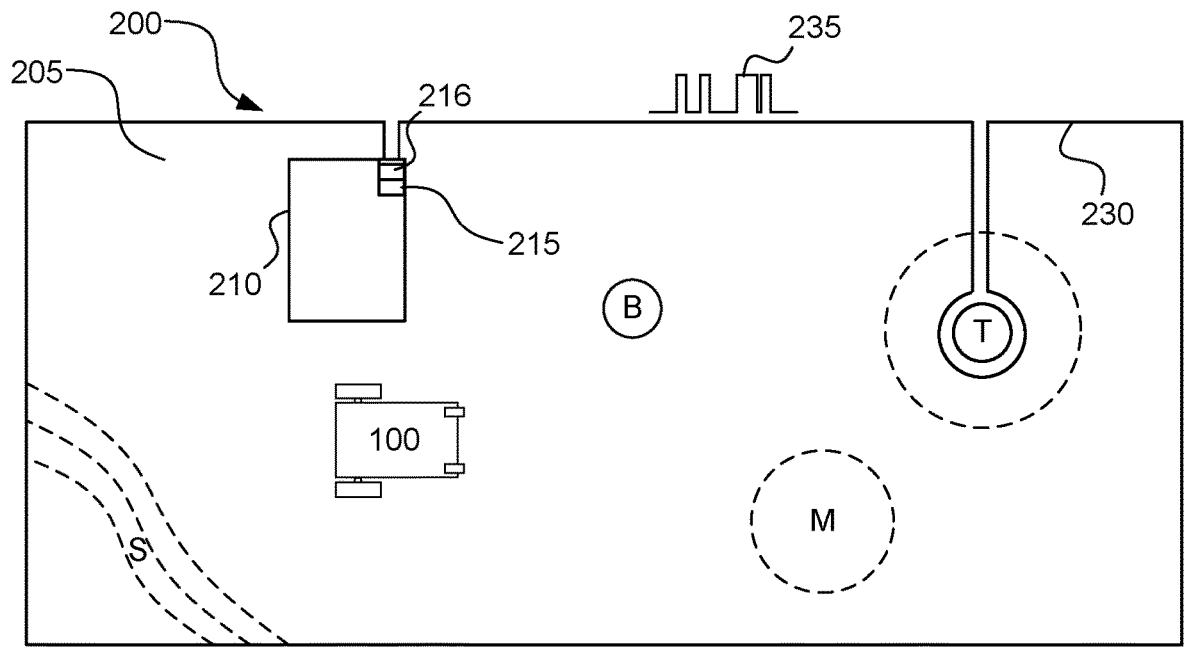
FIG. 2 shows an example of a robotic work tool system being a robotic lawnmower system according to an example embodiment of the teachings herein.

FIG. 2 shows a schematic view of a robotic work tool system 200 in one embodiment. The schematic view is not to scale. The robotic work tool system 200 comprises a robotic work tool 100. As with FIGS. 1A and 1B, the robotic work tool is exemplified by a robotic lawnmower, whereby the robotic work tool system may be a robotic lawnmower system or a system comprising a combinations of robotic work tools, one being a robotic lawnmower, but the teachings herein may also be applied to other robotic work tools adapted to operate within a work area.

The robotic work tool system 200 may also comprise a charging station 210 which in some embodiments is arranged with a signal generator 215 and a boundary wire 230 as discussed with reference to FIG. 1B. The signal generator is arranged to generate a control signal 235 to be transmitted through the boundary wire 230. The boundary wire 230 is arranged to enclose a work area 205, in which the robotic lawnmower 100 is supposed to serve. The control signal 235 transmitted through the boundary wire 230 causes a magnetic field (not shown) to be emitted.

In one embodiment the control signal 235 is a sinusoid periodic current signal. In one embodiment the control signal 235 is a pulsed current signal comprising a periodic train of pulses. In one embodiment the control signal 235 is a coded signal, such as a CDMA signal. As an electrical signal is transmitted through a wire, such as the control signal 235 being transmitted through the boundary wire 230, a magnetic field is generated. The magnetic field may be detected using field sensors (such as the sensors 170 of the robotic lawnmower 100 of FIG. 1B), such as Hall sensors. A sensor—in its simplest form—is a coil surrounding a conductive core, such as a ferrite core. The amplitude of the sensed magnetic field is proportional to the derivate of the control signal. A large variation (fast and/or of great magnitude) results in a high amplitude for the sensed magnetic field. The variations are sensed and compared to a reference signal or pattern of variations in order to identify and thereby reliably sense the control signal.

The robotic work tool system 200 may also optionally comprise at least one beacon (not shown) to enable the robotic lawnmower to navigate the work area using the beacon navigation sensor(s) 175.

The work area 205 is in this application exemplified as a garden but can also be other work areas as would be understood. The garden contains a number of hindrances. In the example of FIG. 2, there are three different types of hindrances: obstacles (exemplified herein by a tree T and a boulder B), slopes (exemplified by a slope S) and slipping areas (exemplified by a muddy area M). A further type of hindrance not explicitly shown but mentioned in the background section is a root.

In order to avoid that the robotic work tool is repeatedly being affected negatively by the same hindrance(s), the inventors have realised that by not only marking the location of the various hindrances, but also classifying the hindrances and controlling the actions of the robotic work tool based on the classification, the robotic work tool 100 may be navigated in relation to the hindrances in a manner that increases the efficiency and reduces the wear and tear of the robotic work tool compared to contemporary robotic work tools.

Figure 3:
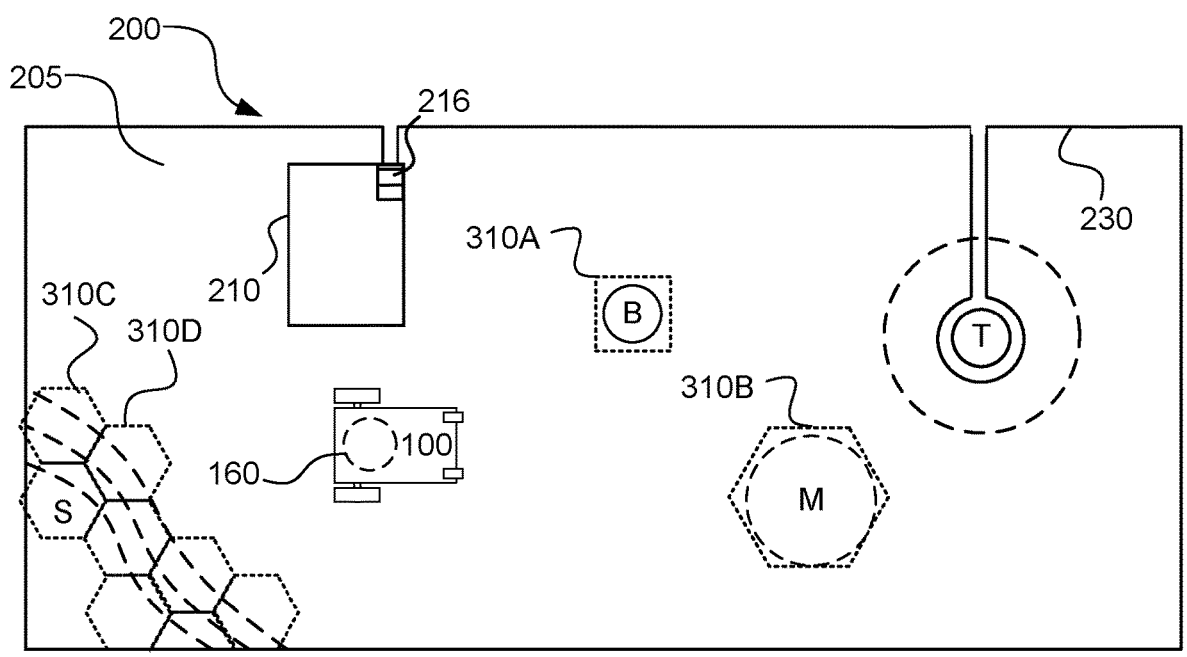
FIG. 3 shows a schematic view of a robotic work tool system according to an example embodiment of the teachings herein.

FIG. 3 shows the schematic view of the robotic work tool system 200 according to FIG. 2. In FIG. 3, area localities 310 are indicated for the various hindrances for marking the locations of the hindrances. In the example of FIG. 3, one area locality 310A marks the location of the boulder B, another area locality 310B marks the location of the muddy area M, and a plurality of area localities 310C, 310D marks the location of the slope S. The area localities 310 are virtual constructs to be stored in the memory 120 of the robotic lawnmower 100 and are not real physical objects.

As can be seen in FIG. 3, an area locality 310 may have any size and/or any shape. It may be a standardized shape, or the shape may be adapted according to the extension of the marked hindrance. For example, the area locality 310A marking the boulder B has a square shape and a size that corresponds to the size of the cutting disc 160 of the robotic lawnmower. Another example shown is the area locality 310B marking the muddy area A, which has a hexagonal shape and a size that corresponds to the size of the muddy area M. A third example is the plurality of area localities marking the slope which all are of a hexagonal shape and have a size corresponding to the size of the cutting disc 160. The shape and/or size of an area locality 310 may be dynamic in that it may change as more is learnt about the hindrance that the area locality 310 marks.

As the robotic lawnmower 100 arrives at an area locality 310, the robotic lawnmower, or rather the controller 110 of the robotic lawnmower 100, is configured to determine the area locality 310. In one embodiment the area locality 310 is determined by determining a location of the robotic lawnmower 100 (as discussed above with reference to FIGS. 1B and 2) and comparing the location of the robotic lawnmower 100 to locations of area localities 310 stored in the memory 120 of the robotic lawnmower 100 and finding a match.

As the area locality 310 has been determined, the controller 110 determines a classifier associated with the area locality 310. In one embodiment the classifier is determined by being retrieved from the memory 120 of the robotic lawnmower 100.

It should be noted that the in some embodiments the classifier does not relate to the size of a hindrance (such as obstacle or area with reduced mobility), but to the nature of the effect of the hindrance, i.e how the hindrance will affect the robot and how it may therefore best be traversed, or avoided. See examples in table 1 below.

It should also be noted that some of the hindrances are not detectable in traditional means for object detection, such as by collision detection.

They are therefore detected by other means, such as by noting wheel slip, irregularities in the work tool (cutter), accelerometer readings (for example indicating a slope).

The controller also determines an action based on the classifier and controls the robotic lawnmower 100 to execute the determined action.

In one embodiment, the action is determined directly by determining the classifier, the classifier in such an embodiment serving both as a classifier and an action, the action being a part of the classifier. The corresponding action may thus be stored along with the classifier (or as part of the classifier) in the memory. Alternatively or additionally, the corresponding action may be stored in an action data base where actions are associated with classifiers. In such an embodiment, the controller 110 is configured to determine the action by querying the action data base based on the classifier.

Examples of classifiers for the hindrances of FIG. 3 are obstacle (for the boulder B), slip area (for the muddy area M) and a slope (for the slope S).

An obstacle could indicate an area that should be avoided so that a collision is avoided thereby increasing the longevity of the robotic lawnmower by decreasing the wear and tear of the robotic lawnmower. The associated or corresponding action could thus be to avoid the area locality 310, by simply turning away from it.

A slip area indicates an area that the robotic work tool has difficulties traversing due to (increased) wheel spin, which may slow down the propelling of the robotic lawnmower 100 and/or affect the steering of the robotic lawnmower 100. An action corresponding to such an area locality 310 may be to slow down the speed of the wheels to prevent wheel slip and thus to ensure (or at least increase the likelihood) that the robotic lawnmower successfully traverses the slip area at a correct course. An alternative corresponding action may be to rotate the robotic lawnmower 100 so that the area locality and thus the slope is entered in reverse. For embodiments where the front wheels of the robotic lawnmower 100 is of a smaller size than the rear wheels, the larger wheels will provide better traction and thus increased control when entering a slip area.

A slope may indicate a hindrance in the robotic work tool 100 is unable to climb the slope due to wheel slip. Alternatively or additionally a slope may indicate an area that the robotic work tool is unable to traverse due to lack of power, should the slope be two steeps. Similarly the slope may indicate a hindrance that the robotic lawnmower traverses in an uncontrollable manner by slipping down the slope. An action corresponding to such an area locality 310 may be to change the approach angle so that the robotic lawnmower 100 approaches the slope at a beneficial angle (or ensure that the robotic lawnmower 100 approaches the slope at the beneficial angle). Such a beneficial angle may indicate an angle at which the slope is less steep, i.e. to not approach the slope head on. An alternative corresponding action may be to rotate the robotic lawnmower 100 so that the area locality and thus the slope is entered in reverse. As for a slip area, embodiments where the front wheels 130' of the robotic lawnmower 100 is of a smaller size than the rear wheels 130'', the larger wheels will provide better traction and thus increased control when entering a slope.

It should be noted that a hindrance may be of a composite type. For example, a gradient may both be a slope and a slip area.

In one embodiment, the area localities may be generated by an operator and stored in the memory 120 of the robotic lawnmower 100, through a man-machine interface. In such an embodiment the man-machine interface is configured to provide a map view of the work area in which the operator may specify an area locality for marking a hindrance and assign a hindrance type to marked hindrance.

In an alternative or additional embodiment, the controller 110 is configured to generate the area localities 310. In such an embodiment the controller 110 is configured to detect a hindrance, or rather that a hindrance has been encountered. A hindrance may be determined to have been detected by receiving sensor input indicating this. The controller is further configured to determine a hindrance type. The hindrance type may be determined based on which sensor provides the indication that a hindrance has been detected. For example, an obstacle may be detected be receiving input from the collision sensor(s) 175, a slip area may be detected be receiving input from the odometer(s) 180-1 (which may be arranged to detect wheel spin) and a slope may be detected by receiving input from the gyroscope or accelerometer 180. In some embodiments, an obstacle may be detected using range finding sensors, such as radar, or ultrasonic sensors. In some embodiments, an obstacle may be detected using visual sensors, such as a camera, in cooperation with suitable image processing being performed by the controller 110.

The controller 110 is further configured to determine the classifier based on the hindrance type and store the classifier along with the area locality in the memory 120. The controller 110 may further be configured to determine a corresponding actin that enables the robotic lawnmower 100 to safely navigate the detected hindrance.

In the following, additional details will be given regarding the area localities, the classifiers and the corresponding actions, the additional details supplementing the previously discussed embodiments.

Figure 4:
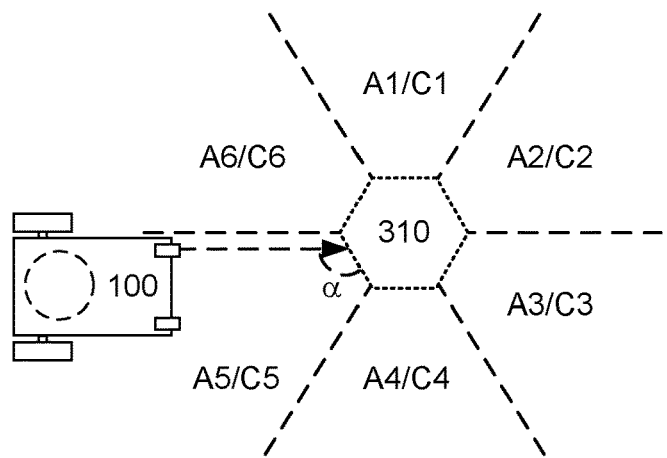
FIG. 4 shows a schematic view of an area locality according to an example embodiment of the teachings herein.

FIG. 4 shows a schematic view of an example of an area locality 310, as discussed above and especially in relation to FIG. 3, and a robotic lawnmower 100 approaching the area locality 310. In this example the area locality 310 has a hexagonal shape, but as stated above, an area locality may have any shape including but not limited to square, rectangular, circular, oval, hexagonal, octagonal, or shaped according to the extent of the associated hindrance.

The inventors have realized that a hindrance may have different characteristics depending on which direction the hindrance is approached. For example, a slope is definitely different if it is approached from below or from above. Other examples are roots, which also may have a different character depending on the direction approached, and low-hanging branches, which may be a hindrance in one direction, but not in another direction where they simply are brushed away. The inventors have further realised that by adapting a robotic work tool's behaviour in relation to a hindrance based on the direction that the robotic work tool arrives at the hindrance, a hindrance may be navigated more efficiently than compared to using the same technique irrespective of the direction. To enable this an area locality 310 is, in some embodiments, associated with a plurality of angle sectors A1-A6. In the example of FIG. 4, there are six angle sectors A1-A6, and each angle sector corresponds to a side of the hexagonal shaped area locality 310. However, it should be noted that the number of angle sectors may be any number and the distribution need not be tied to the shape of the area locality 310. For example, an area locality 310 having but one angle sector will provide the same action irrespective of the arrival direction of the robotic lawnmower 100. In such an embodiment, it is not necessary to determine the angle that the robotic lawnmower 100 reaches the area locality 310 at. The angle sectors A1-A6 may be evenly distributed having a same radial size, or unevenly distributed some having different radial sizes.

To enable the robotic lawnmower 100 to adapt its behavior according to the angle that the robotic lawnmower 100 reaches the area locality 310 at, each angle sector A1-A6 is associated with a classifier C1-C6 which in turn enables for associating different actions to different angle sectors A1-A6. It should be noted that different angle sectors may have the same classifier, and possibly also the same action. In such a case, the angle sectors having the same classifier and same action associated with them may be replaced or treated as one and the same angle sector.

In the example of FIG. 4, the robotic lawnmower 100 arrives at the area locality 310 in the angle sector A5. As the robotic lawnmower 100 determines that it has reached the area locality at an arrival angle corresponding to the angle sector A5, it determines the associated classifier C5, by retrieving the classifier C5 from the memory 120, and then determines the associated action. As stated above, the action may be given by the classifier.

Examples of classifiers and examples of associated actions are given by table 1 below.

indicating a slope may be to rotate and enter the gradient in reverse, ensuring proper traction enabling the robotic lawnmower 100 to climb the gradient.

The inventors have further realised that not only does the direction or angle at which the robotic lawnmower 100 reaches an area locality 310 influence the characteristics of the hindrance, but that also the angle that the robotic lawnmower 100 arrives at the area locality 310 may be affect how the robotic lawnmower is able to navigate the hindrance. Indicated in FIG. 4 is the arrival angle alpha ($\alpha$) of the robotic lawnmower 100 and the controller 110 of the robotic lawnmower 100 is, in some embodiments, configured to determine the classifier and/or the associated action based on the arrival angle alpha. The determination of the angle at which the robotic lawnmower 100 reaches the area locality 310 may thus include determining the angle sector, determining the arrival angle or determining both the angle sector and the arrival angle. The classifier of an angle sector may thus depend on the arrival angle also.

To illustrate with the example above. If the robotic lawnmower reaches the area locality 310 in angle sector A5, basically meaning that the gradient is reached from the side, the robotic lawnmower 100 will behave differently depending on the actual arrival angle alpha. In the example of FIG. 4 the arrival angle alpha indicates that the robotic lawnmower 100 will travel along the slope, whereby no specific action may be needed. However, if the robotic lawnmower 100 arrives at an angle from below (a low arrival angle alpha in FIG. 4) the robotic lawnmower 100 may need to take action such as rotating and entering in a reverse mode.

Determining the arrival angle may become superfluous by increasing the number of angle sectors and/or by assigning

TABLE 1

| Classifiers and corresponding actions | |
|---|---|
| CLASSIFIER | ACTION |
| AVOID_SLIPPING | REDUCE SPEED |
|  | ENTER IN REVERSE |
| AVOID_TRAVEL_OBSTRUCTION | TURN AWAY |
| AVOID_CUTTING_OBSTRUCTION | TURN AWAY |
|  | REDUCE CUTTING POWER |
|  | INCREASE CUTTING HEIGHT |
| AVOID_SLOPE | TURN AND ENTER AT AN ANGLE |
|  | ENTER IN REVERSE |
|  | REDUCE SPEED |
| AVOID_SET_BY_USER | USER SPECIFIED |
| OK_SLIPPING | NOTIFY |
| OK_TRAVEL_OBSTRUCTION | NOTIFY |
| OK_CUTTING_OBSTRUCTION | NOTIFY |
| OK_SLOPE | NOTIFY |
| OK_SET_BY_USER | USER SPECIFIED |
| OK_NO_ISSUES | NO ACTION |

To illustrate with an example, if the area locality marks a gradient where the high point is entered through angle sector A1 and the low point is entered through angle sector A4, the area locality 310 may have different classifiers C1-C6 for the different angle sectors A1-A6. To prevent the robotic lawnmower 100 from slipping down the gradient, the angle sector A1 corresponding to the high point may have a classifier C1 indicating a slipping area (for example AVOID_SLIPPING), and to enable the robotic lawnmower 100 to properly climb the gradient, the angle sector A4 corresponding to the low point may have a classifier indicating a slope (AVOID_SLOPE). The action associated with classifier C1 indicating a slipping area may be to reduce the speed at which the gradient is entered. The action associated with classifier C4 unevenly distributed angle sectors, as a narrow angle sector would directly imply the arrival angle alpha (or at least an approximation thereof).

Figure 5A:
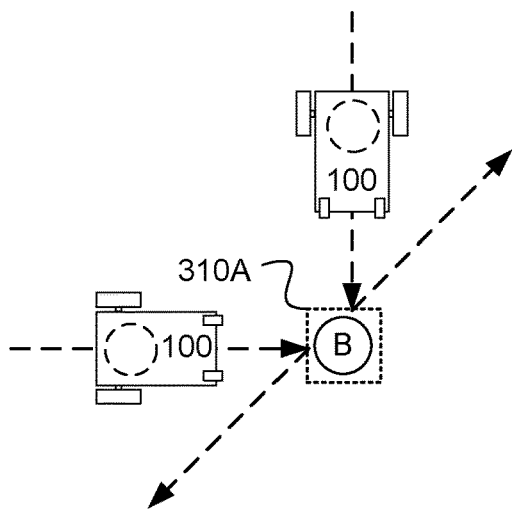
FIGS. 5A, 5B and 5C each shows a schematic view of a robotic work tool and an area locality according to an example embodiment of the teachings herein.
Figure 5B:
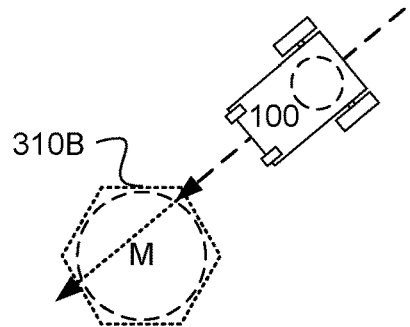
Figure 5C:
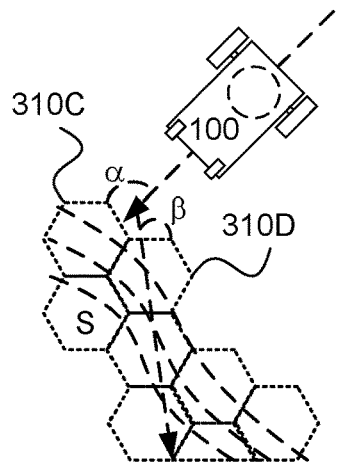

FIGS. 5A, 5B and 5C each shows more examples of hindrances with associated area localities 310 and corresponding classifiers and actions.

FIG. 5A shows an area locality 310A marking a hindrance being classified as an obstacle or AVOID_TRAVEL_OBSTRUCTION using the classifiers of table 1, in the example of FIG. 3, the obstacle is the boulder B. For an obstacle, the classifier and the associated action may be the same irrespective of the angle the robotic lawnmower 100 reaches the obstacle, and the robotic lawnmower 100 will turn away from the obstacle whichever direction it comes from, to avoid a collision thereby reducing the wear and tear thus increasing the longevity of the robotic lawnmower 100.

FIG. 5B shows an area locality 310B marking a hindrance being classified as a slipping area or AVOID_SLIPPING using the classifiers of table 1, in the example of FIG. 3, the slipping area is the muddy area M. In this example the associated action is to enter the muddy area at a reduced speed (as indicated by the line showing the travel direction in FIG. 5B changing character from dashed to dotted), thereby reducing the risk of wheel spin.

FIG. 5C shows a plurality of area localities 310C, 310D marking a hindrance being classified as a gradient or AVOID_SLOPE using the classifiers of table 1, in the example of FIG. 3, the gradient is the slope S. In this example the associated action is dependent on the angle of arrival alpha ($\alpha$) as the gradient is not as steep in each arrival angle alpha. The associated action is in this example to turn and enter at an approach angle beta ($\beta$), which enables the robotic lawnmower 10 to "flatten out" the gradient. As is indicated in the example of FIG. 5C, the action may alternatively be to turn and enter the adjacent area locality 310D. In both cases, the robotic lawnmower 100 is able to "flatten out" the slope and will thereby increase its chances of successfully climbing the slope.

Returning to FIG. 3, in one embodiment the controller 110 is further configured to store at least one indication of an area locality 310 and associated classifier C in a virtual map in the memory 120. In doing so, the robotic lawnmower 100 is able to maintain a (virtual) map of the area localities 310 and the associated classifiers, and also possibly the associated approach angles (beta). In such embodiments, the robotic lawnmower is enabled to navigate the work area and adapt the navigating based on the area localities to achieve an efficient navigation not requiring unnecessary turns and retracing. In one such embodiment, the robotic lawnmower is configured to store area localities being adjacent one another, such as the area localities 310C, 31D for the slope S in FIG. 3, whereby a portion of—possibly the whole—work area 205 may be mapped out using area localities 310 in order to plan and achieve an efficient operation. The controller 110 is thus configured to operate the robotic working tool 100 within a work area 205 and to store a plurality of indications of area locality 310 and associated classifier C, wherein the stored area localities are adjacent one another and covers at least a portion of the work area 205.

The robotic lawnmower may thus retrieve at least on area locality 310 from the memory 120 and adapt the navigation of the robotic lawnmower based on the location of the area locality and/or the classifier of the area locality.

Figure 6:
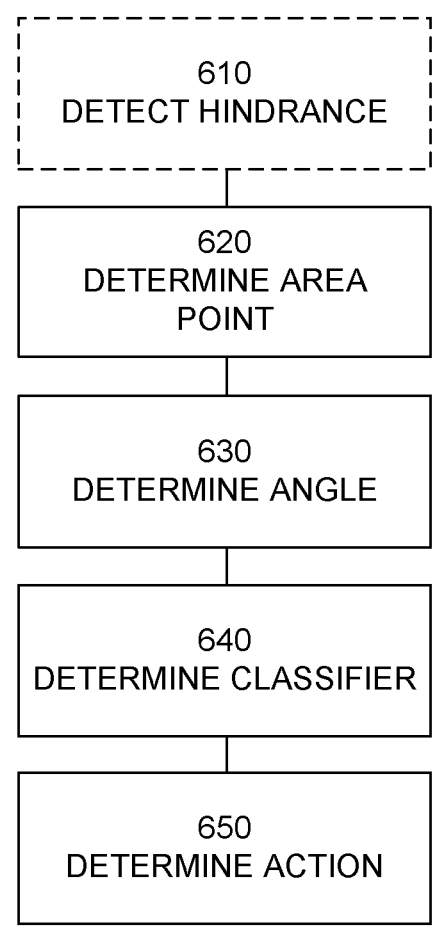
FIG. 6 shows a corresponding flowchart for a method according to an example embodiment of the teachings herein.

FIG. 6 shows a flowchart of a general method according to the teachings herein. As disclosed above; the robotic work tool 100 determines 620 an area locality 310, possibly by determining the location of the robotic work tool 100 and matching it to the area locality 310. The robotic work tool determines 640 a classifier C associated with the area locality 310 and also determines 650 an action for the robotic work tool 100, wherein the action is based on the classifier C, possibly by being included in the classifier C. Different examples of actions have been given above and some of these are adapting the speed of approach, avoid area locality, enter in reverse, approach at an approach angle beta, and to stop the work tool [MORE EXAMPLES]. Other examples of actions include, but are not limited to limiting acceleration, limiting a turn angle (especially for multi-chassis embodiments, and to raise or lower cutting device.

In one embodiment, the classifier may also be associated or depend on environmental sensors providing an environmental aspect, such as rain (or moisture) sensors or other weather sensors (and/or weather historical data). In embodiments where the classifier is based on an environmental aspect, the action will also depend on the environmental aspect, and the environmental aspect may control to what degree the action is executed to. For example, accelerations may be (further) limited if the environmental aspect indicates wet conditions to prevent slipping.

As discussed above, the robotic work tool 100 may generate the area localities 310. In such embodiments, the robotic work tool 100 detects 610 a hindrance S, M, B and determines 620 the area locality 310 by generating the area locality 310 and associating the hindrance S, M, B with the area locality 310. The robotic work tool 100 then determines 640 the classifier C based on a type of hindrance S, M, B and stores the classifier C. Different types of hindrances have been discussed above and some of these are gradient, slip, and obstacle. Another example is an area with increased risk of getting stuck for which an associated action could be to increase the speed of the robotic work tool 100.

In one embodiment an area locality may be associated with a cutting height, whereby a robotic lawnmower may either raise the cutting height (or otherwise adapt it) before entering the area, or to turn away with an unchanged cutting height.

The robotic work tool may also be configured to determine the classifier and especially the action by receiving sensor input while traversing the hindrance or area locality. Examples of sensor input are: the actual gradient of a slope given by a gyroscope or an accelerometer, and vibrations (leading to a reduced speed) given by an accelerometer.

In some embodiments the robotic work tool 100 is further configured to associate a counter with an area locality 310 (possibly a counter for each angle sector) and increase the counter each time the area locality 310 is reached (at the angle sector). A classifier may be associated with a classifier threshold and when the area locality counter exceeds the classifier threshold, the associated classifier is determined 640 to correspond to the area locality 310. For example, an area locality 310B may be determined to be classified as a slipping area only when the robotic work tool 100 has slipped in the area a number of times. Alternatively or additionally, the classifier and associated action may be dependent on the counter in that as an area locality 310 is reached a number of times, the classifier changes so that the area locality 310 is avoided to avoid over processing of the area.

As discussed above in relation to FIGS. 4, 5A, 5B, and 5C, the robotic work tool 100 may also determine 630 an angle at which the robotic work tool 100 reaches the area locality 310 and determine 640 the classifier C based on the angle at which the robotic work tool 100 reaches the area locality 310. As also discussed above, the angle at which the robotic work tool 100 reaches the area locality 310 corresponds to one out of a plurality of angle sectors A1-A6. The classifier is then associated with and determined 640 based on said one out of a plurality of angle sectors A1-A6. Alternatively the angle at which the robotic work tool 100 reaches the area locality 310 corresponds to an arrival angle alpha of the robotic work tool 100, whereby the classifier C is determined 640 based on said arrival angle alpha. As also discussed above, the angle at which the robotic work tool 100 reaches the area locality 310 may correspond to both one out of a plurality of angle sectors A1-A6 and to the arrival angle alpha of the robotic work tool 100, whereby the classifier C is based on said one out of a plurality of angle sectors A1-A6 and said arrival angle alpha, for example as in the examples discussed above with reference to FIGS. 4 and 5C.

The invention claimed is:

1. A robotic work tool system comprising a robotic work tool comprising a controller, the controller being configured to:
   determine an area locality associated with a hindrance;
   determine angles at which the robotic work tool approaches the area locality;
   determine a classifier associated with the area locality;
   determine an action for the robotic work tool; and
   control the robotic work tool to perform the action,
   wherein the action is based on the classifier,
   wherein the angles at which the robotic work tool approaches the area locality corresponds to one out of a plurality of angle sectors and to an arrival angle of the robotic work tool, and
   wherein the classifier is based on both the one out of the plurality of angle sectors and the arrival angle.

2. The robotic work tool system according to claim 1, wherein the classifier is associated with a nature of an effect of the area locality.

3. The robotic work tool system according to claim 1, wherein the controller is further configured to:
   detect the hindrance;
   determine the area locality;
   associate the hindrance with the area locality; and
   determine the classifier based on a type of hindrance and store the classifier.

4. The robotic work tool system according to claim 3, wherein the type of hindrance is at least one of gradient, slip, obstacle, or stuck.

5. The robotic work tool system according to claim 1, wherein the controller is further configured to determine the classifier based on a retrieval of a stored classifier.

6. The robotic work tool system according to claim 1, wherein the controller is further configured to:
   increase a counter associated with the area locality;
   determine whether the counter exceeds a classifier threshold associated with a hindrance type and a corresponding classifier, and, if so, determine the corresponding classifier to be a classifier associated with the classifier threshold.

7. The robotic work tool system according to claim 1, wherein the robotic work tool further comprises a memory and wherein the controller is further configured to store at least one indication of the area locality and associated classifier in a virtual map in the memory.

8. The robotic work tool system according to claim 7, wherein the controller is further configured to operate the robotic work tool within a work area and to store a plurality of indications of area locality and associated classifier, wherein the stored area localities are adjacent one another and covers at least a portion of the work area.

9. The robotic work tool system according to claim 7, wherein the controller is further configured to retrieve at least one area locality from the memory and adapt the navigation of the robotic work tool based on the location of the area locality and/or the classifier of the area locality.

10. The robotic work tool system according to claim 1, wherein the controller is further configured to determine the area locality based on a determination of the location of the robotic work tool.

11. The robotic work tool system according to claim 1, wherein the action is at least one of: adapting speed of approach, avoiding area locality, entering in reverse, approaching at an approach angle, stopping work tool, limit acceleration, limiting turn angle, or adapting operating height of work tool.

12. The robotic work tool system according to claim 1, wherein the robotic work tool is a robotic lawnmower.

13. A method for use in a robotic work tool system comprising a robotic work tool, the method comprising:
   determining an area locality associated with a hindrance;
   determining angles at which the robotic work tool approaches the area locality;
   determining a classifier; and
   determining an action for the robotic work tool; and
   control the robotic work tool to perform the action,
   wherein the action depends on the classifier,
   wherein the angles at which the robotic work tool approaches the area locality corresponds to one out of a plurality of angle sectors and to an arrival angle of the robotic work tool, and
   wherein the classifier is based on both the one out of the plurality of angle sectors and the arrival angle.

* * * * *